(12) United States Patent
Tangezaka et al.

(10) Patent No.: US 7,025,270 B2
(45) Date of Patent: Apr. 11, 2006

(54) AUTOMATIC ADJUSTMENT OF ILLUMINATION FOR READING BARCODES AND SIMILAR ITEMS

(75) Inventors: Yoshinori Tangezaka, Tokyo (JP); Tomoki Koikawa, Saitama (JP)

(73) Assignee: Optoelectronics Co., Ltd., Warabi (JP)

( * ) Notice: Subject to any disclaimer, the term of this patent is extended or adjusted under 35 U.S.C. 154(b) by 0 days.

(21) Appl. No.: 10/920,700

(22) Filed: Aug. 18, 2004

(65) Prior Publication Data

US 2006/0038016 A1   Feb. 23, 2006

(51) Int. Cl.
*G06K 7/10* (2006.01)

(52) U.S. Cl. .................. 235/462.06; 235/462.01; 235/462.05; 235/462.41

(58) Field of Classification Search .......... 235/462.06, 235/462.05, 462.11, 462.24, 462.33, 462.01, 235/462.41, 462.42, 462.49, 462.45, 455, 235/454, 478, 462.26, 462.28
See application file for complete search history.

(56) References Cited

U.S. PATENT DOCUMENTS

| | | | |
|---|---|---|---|
| 5,381,438 A | | 1/1995 | Guo et al. |
| 5,406,062 A | * | 4/1995 | Hasegawa et al. ..... 235/462.42 |
| 5,616,907 A | * | 4/1997 | Hasegawa et al. ..... 235/462.42 |
| 5,701,001 A | * | 12/1997 | Sugifune et al. ....... 235/462.42 |
| 5,756,981 A | * | 5/1998 | Roustaei et al. ....... 235/462.42 |
| 5,852,286 A | * | 12/1998 | Coleman ............... 235/462.01 |
| 6,010,070 A | * | 1/2000 | Mizuochi et al. .......... 235/455 |
| 6,045,044 A | * | 4/2000 | Coleman ............... 235/462.49 |
| 6,296,187 B1 | * | 10/2001 | Shearer ................. 235/462.41 |
| 6,857,572 B1 | * | 2/2005 | Martin et al. .......... 235/462.45 |
| 2002/0145041 A1 | * | 10/2002 | Muthu et al. ............... 235/454 |

FOREIGN PATENT DOCUMENTS

| | | | |
|---|---|---|---|
| JP | 06-123851 A | | 5/1994 |
| JP | 06176185 A | * | 6/1994 |
| JP | H07-6197 | | 1/1995 |
| JP | 2001-308439 A | | 11/2001 |
| WO | WO 2003/019463 A | | 3/2003 |

OTHER PUBLICATIONS

International Search Report and Written Opinion Sep. 23, 2004.

* cited by examiner

*Primary Examiner*—Steven S. Paik
(74) *Attorney, Agent, or Firm*—Kaplan Gilman Gibson & Dernier LLP

(57) ABSTRACT

A barcode or similar scanning device is adjusted and calibrated by utilizing test pulses and measuring the peaks and calculating average of reflected light. The duty cycle of the pulses is adjusted based upon the measurements taken, in order to insure that the amount of reflected light is within the appropriate range associated with the charge coupling device or similar device collecting the reflective light.

3 Claims, 3 Drawing Sheets

AUTOMATIC ADJUSTMENT OF ILLUMINATION FOR READING BARCODES AND SIMILAR ITEMS

TECHNICAL FIELD

This invention relates to a method and apparatus for supplying the appropriate amount of light from a source such as a light diode (LED) or plural LEDs to provide illumination for scanning and reading bar code symbols and the like.

BACKGROUND OF THE INVENTION

Symbol readers, such as barcode scanners and readers, are well known in the art. Often, such devices are based upon charge coupled device (CCD) technology, wherein a linear array CCD device is used to recover light reflected from the barcode. In such systems, plural LEDs are used as a light source to illuminate an object such as a barcode. The reflected light is received by the CCD linear array, which converts the light energy into electrical energy. The varying electrical signal can then be processed to recover the barcode symbol, which represents the information of interest.

In such systems, the light source often must be calibrated with manual adjustments because of variances between power output by the individual LEDs, total LED output, sensitivities of the CCD, and other variances among such systems. This calibration is often accomplished in the prior art by physically adjusting a variable resistor, thereby altering the amount of current supplied to the LEDs, and hence, changing its brightness.

Although this practice is relatively straightforward and well known in the art, it adds costs to the product. Manual adjustment is required, and the additional cost of the variable resistor to adjust the current supplied to the LEDs is not insignificant. Moreover, the requirement for an additional component, ie; the variable resistor, adds another potential point of failure in to the system, and hence further increases cost. Accordingly, the prior art systems are less than optimal in the sense that costly procedures and components are required in order to appropriately calibrate and adjust the light source(s) used to illuminate the barcode or similar image.

SUMMARY OF THE INVENTION

The above and other problems of the prior art are overcome in accordance with the present invention that relates to a technique that provides for automatic microprocessor based adjustment and calibration of LED power to bring it to within an appropriate range suitable for optimum detection by the CCD linear array. In accordance with the invention, the LED power is adjusted by first taking the average light received by the CCD for plural cycles during a reading or scanning operation. The calculated average of signal amplitude between maximum and minimum wave is compared to a range. The duty cycle of pulses to be used during the scanning operation is adjusted upward or downward, as appropriate, to bring the total received light energy during scanning into the appropriate range for the linear CCD array.

The maximum and minimum peaks of the analog signal are measured for plural image outputs and the average is calculated. The number of plural images selected for use to adjust the light output is usually less than the total number of images taken to actually read the symbol. By utilizing the foregoing method to adjust the light energy, rather than the amount of current through the LEDs, as in prior techniques, the entire arrangement can be controlled simply with a microprocessor, present in the scanning system anyway, so that no additional parts such as variable resistors are needed.

DETAILED DESCRIPTION OF THE PREFERRED EMBODIMENT

Figure 1:
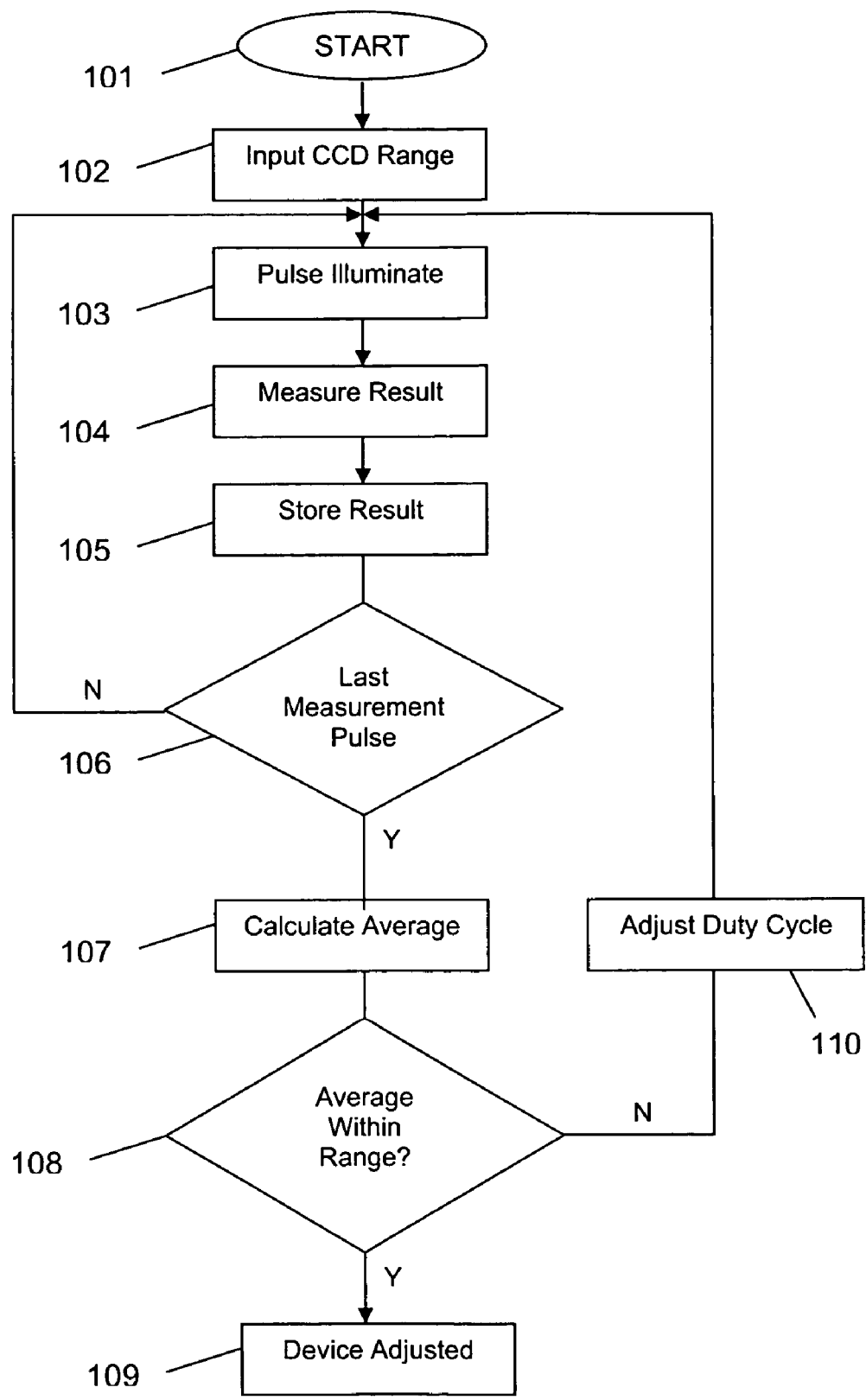
FIG. 1 represents a flowchart depicting an exemplary embodiment of the present invention.

FIG. 1 represents a flowchart of the operational steps that may be executed by a central processing unit (CPU) in connection with the implementation of an exemplary embodiment of the present invention. The flowchart shown in FIG. 1 is intended to be only the conceptual steps, and the invention described herein is not limited to any particular programming language or software implementation. Additionally, the techniques described herein may be implemented in hardware, software, or a combination of both, and the flowchart of FIG. 1 is intended to be exemplary only, and is not by way of limitation.

In accordance with an embodiment of the invention, the process is entered at start block 101 and control is transferred to block 102 for inputting the CCD range. The dynamic range of the CCD is a parameter associated with the linear CCD typically utilized in the devices at issue, and is known in advance of the methodology executed. This range may be specified by the manufacturer, or determined empirically, but in either event, it is a parameter that is input and utilized by the methodology. This range may be stored in non-volatile memory so that it is available when the system is powered up.

After the range parameter is input, control is transferred to block 103 where the bar code is scanned by illuminating it and measuring the reflected light, as is conventional, plural times through the use of a pulsating light source. When practiced, the plural LED's utilized to illuminate the exemplary bar code being scanned may be turned on and off at a rate of, for example, 100 hertz. If ten pulses are utilized to implement the light source adjustment methodology described herein, then only approximately 100 milliseconds will be needed for the implementation of the inventive method.

In any event, block 103 represents a single such illumination pulse, which might last, for example, ten milliseconds. After the pulse illuminates the symbol, the result is measured at block 104 and stored at block 105. This stored result is indicative of the total light energy captured by the CCD linear array as a result of the light reflected from the symbol being scanned. The CCD linear array converts the captured light into electrical energy, and the magnitude of the electrical energy is a function of the total light energy captured. This value depends upon both the duration and amplitude of the pulses of light used to illuminate the symbol.

Once the result is stored, control is transferred to decision point 106 as shown to determine if the last of the pulses that are going to be used for this measurement step has already occurred. If not, the algorithm transfers control back up to the pulse illuminate block 103, and the next pulse of the approximately 10 sample pulses that will be used for adjustment occurs.

The foregoing three steps of illuminating the symbol to be read with a pulse of light from the LED's, measuring and storing the results, and determining whether the last measurement has occurred continues repeatedly until all ten sample pulses and associated measurements have occurred. At that point, as shown in FIG. 1, control is transferred to block 107 which calculates the average value of the light reflected and captured by the CCD during steps 103–106.

At decision point 108 a determination is made as to whether or not the average light received by the CCD linear array is within the acceptable range input at step 102. If so, the device is adjusted correctly, and the algorithm exits at block 109. Block 109 may also cause a particular indicator to activate, notifying the user that the device is properly calibrated. Alternatively, different colored lights or signals may alert the user that the illumination level needs to be adjusted upward or downward.

If, on the other hand, the average is outside of the range input at block 102, then the duty cycle of the pulses utilized are adjusted at block 103 making them longer or shorter as appropriate. The longer the pulse is made, the more light energy will be reflected, and hence the average will be brought from below to within the specified range. Conversely, if the average is too high, the duty cycle may be made shorter, resulting in less light energy being captured, and hence, bringing the average to within the range.

It is also noted that although the average light energy received during each pulse should be within the specified range, it may also be necessary to determine the maximum and minimum amounts of light energy received in order to ensure proper operation. More specifically, it is possible that the calculated average could be within the specified range, but that average could be the result of two readings below the specified range, and two above the specified range. This would be undesirable, as it would result in readings outside the specified range.

Hence, it may be desirable to include an additional step whereby not only is the average light energy received by the CCD array within a specified range, but also that most or all of the individual pulses represented by block 103 of FIG. 1 result in light energy falling within the specified range associated with the CCD linear array.

Figure 2:
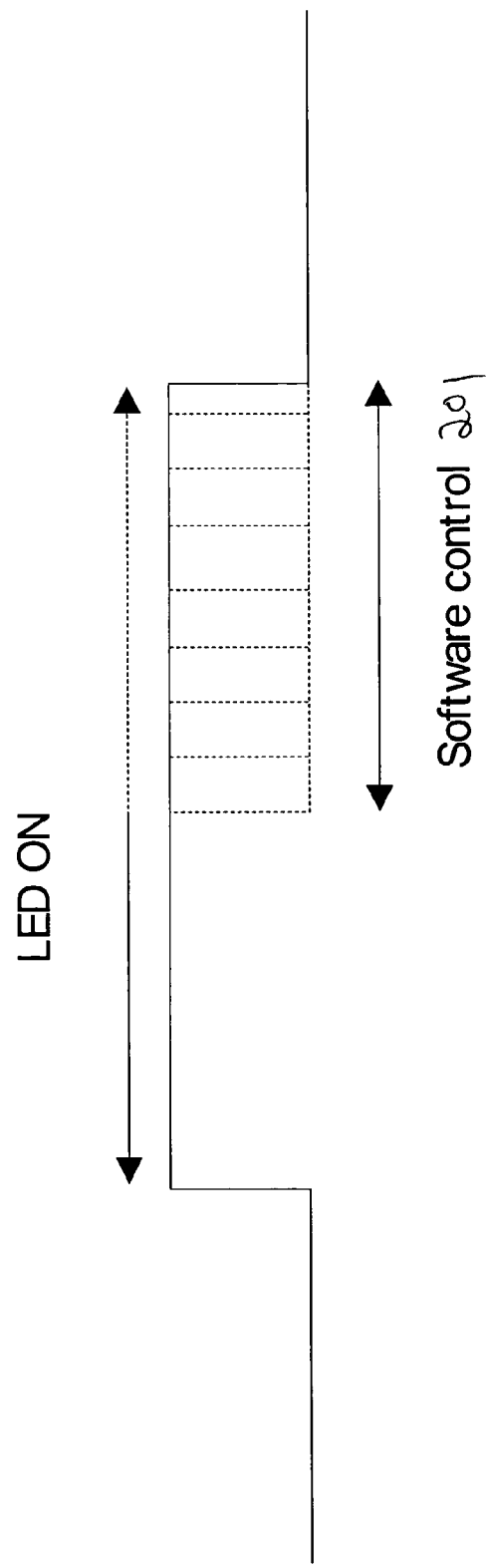
FIG. 2 depicts a signal with a controllable duty cycle that may be used to implement an embodiment of the invention.
Figure 3:
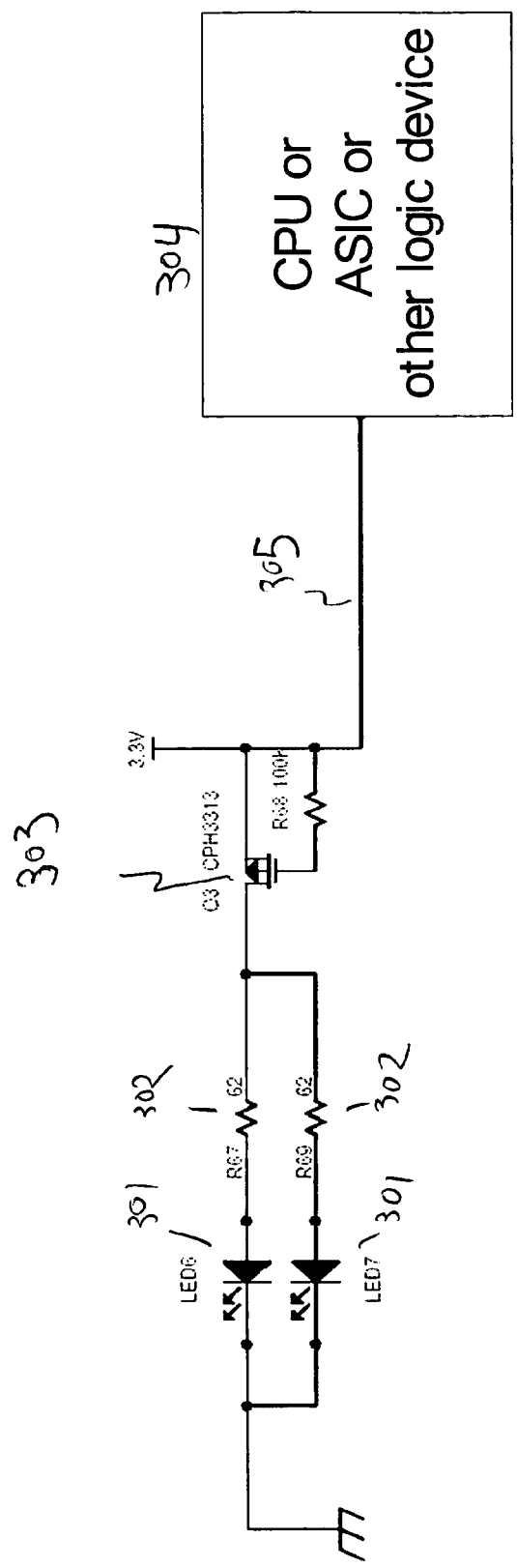
FIG. 3 depicts and exemplary apparatus for generating the duty cycle controlled signal of FIG. 2.

FIG. 2 shows graphically the LED on signal, wherein the duty cycle may be altered as indicated by software control dotted lines 201. The system of FIG. 3 depicts an actual exemplary implementation of the invention. LEDs 301 are illuminated in cycles to generate pulses of light, each one of which has a duty cycle that is determined by CPU or logic device 304. More particularly, by changing the time for which line 305 stays high, the duty cycle and total light output from LEDs 301 may be precisely controlled, having the effects described above.

The above is intended to be exemplary only, and various modifications should be apparent to those of ordinary skill in the art. Therefore, the claims should not be limited by the above examples.

The invention claimed is:

1. A method of adjusting a light source to be used with a symbol reader, the method comprising illuminating a test symbol with a pulsating light source, measuring the total light emitted from the symbol in response, and adjusting a duty cycle associated with said pulsating light source in response to measuring average total light emitted across plural cycles to thereby bring said average total light within a specified range, wherein said specified range is a dynamic range over which a charge coupled device is capable of correctly operating, and wherein said method further comprises:

using a first plurality of pulses to calculate said average, said first plurality being less than a number of pulses normally used to read a symbol during operation when said symbol reader is not being calibrated and adjusted.

2. A method of adjusting a light source to be used with a symbol reader, the method comprising illuminating a test symbol with a pulsating light source, measuring the total light emitted from the symbol in response, and adjusting the average emitted light to within a predetermined range in response to said measuring, wherein the method further comprises using a first plurality of pulses to calculate said average, said first plurality being less than a number of pulses normally used to read a symbol during operation when said symbol reader is not being calibrated and adjusted.

3. The method of claim 2 wherein said adjusting the average is accomplished by adjusting the duty cycle of pulses for a light source.

* * * * *